Aug. 15, 1967  M. L. STRYDOM  3,336,085
PNEUMATIC CONVEYANCE OF GOODS
Filed Sept. 20, 1965  2 Sheets-Sheet 2
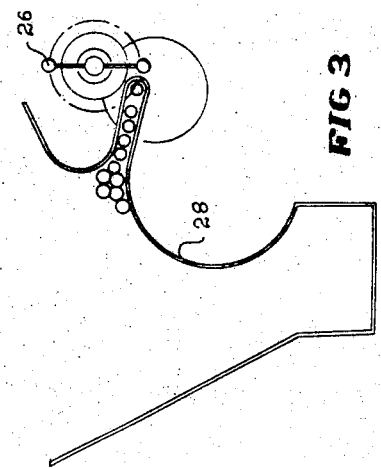
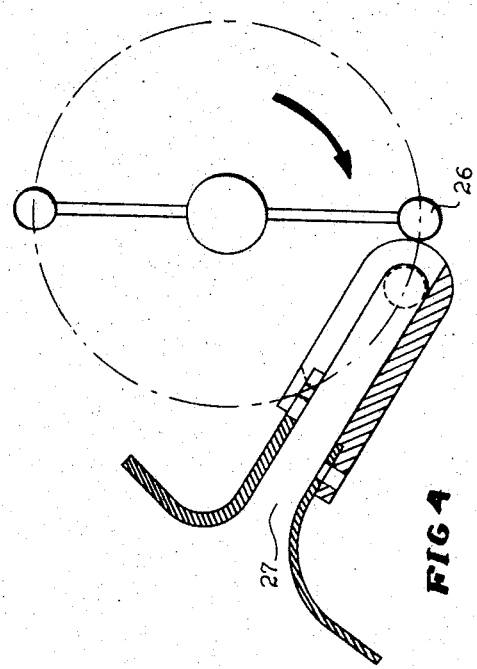
INVENTOR
MAURITZ L. STRYDOM
BY Young + Thompson
ATTYS.

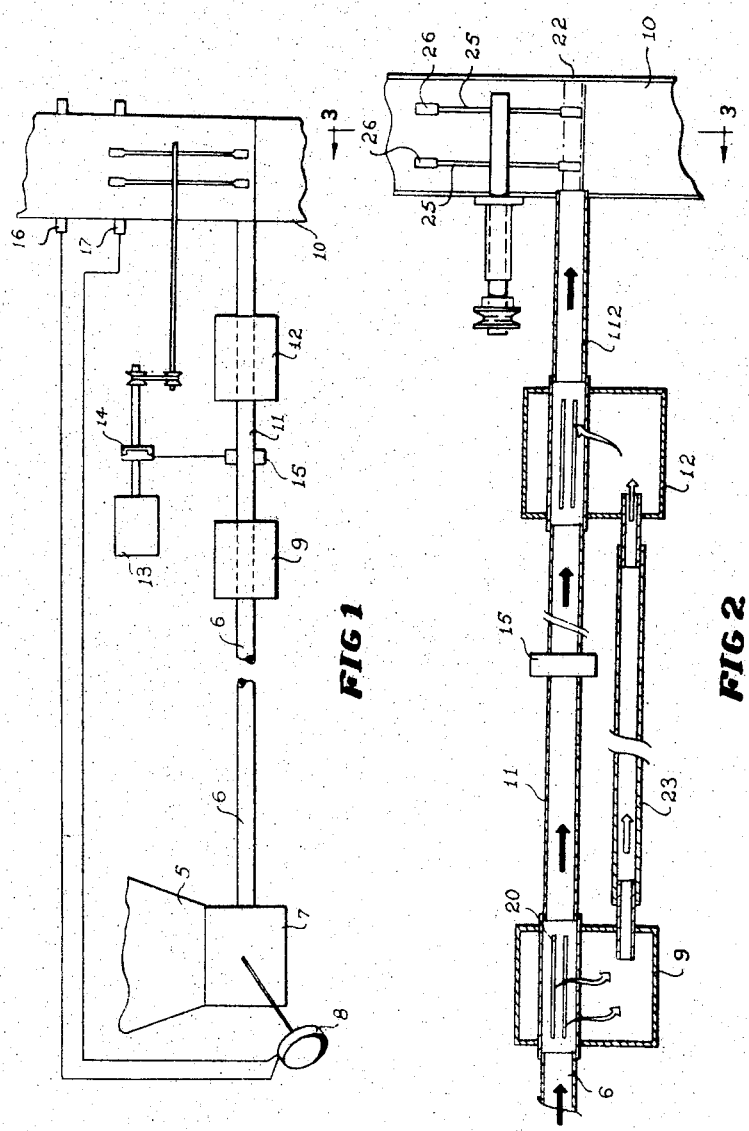

United States Patent Office 3,336,085
Patented Aug. 15, 1967

3,336,085
PNEUMATIC CONVEYANCE OF GOODS
Mauritz L. Strydom, Stellenbosch, Cape Province, Republic of South Africa, assignor to Rembrandt Tobacco Corporation (Overseas) Limited, Stellenbosch, Cape Province, Republic of South Africa
Filed Sept. 20, 1965, Ser. No. 488,514
Claims priority, application Republic of South Africa, Sept. 30, 1964, 64/4,661; June 18, 1965, 65/3,224
4 Claims. (Cl. 302—2)

This invention relates to the pneumatic conveyance of goods.

It has already been proposed to convey goods of various descriptions from one point to another. Thus it has also been proposed to convey rod-shaped articles, such as cigarette filter stubs, from a point of dispatch, e.g. the point where filters are made or stored, to a point of consumption, e.g. where the filters are being incorporated into cigarettes, by pneumatic means.

However, during pneumatic transport the articles do not retain their separation in time due to standing waves, differences in frictional forces and differences in aerodynamic shapes. Thus a successful pneumatic system must ensure that a machine such as a cigarette making machine, which consumes articles at a fixed rate, is constantly being fed in spite of the different separations in time between articles being transported.

A South African patent specification which came open to public inspection on Dec. 30, 1964, proposes a method of pneumatic conveyance in which goods are continuously dispatched, conveyed, brought to a rest, dispensed from a length brought to rest, the goods thus dispensed are stored, the stored goods are consumed, dispatch is periodically interrupted when the amount stored reaches a predetermined higher level and resumed when the amount stored reaches a predetermined lower level, and the rates of dispatch and dispensing are so controlled that the rate of dispatch is faster than the rate of dispensing which in turn is faster than the known rate of consumption.

The present invention is concerned with a method of the kind outlined in the previous paragraph, but provides the steps of so controlling the rate of dispatch and the rate at which goods are dispensed, that the rate of dispatch is faster than the rate of consumption of stored goods and the rate of dispensing is faster than the rate of dispatch.

Further according to the invention the goods are only then dispensed when a predetermined minimum length of goods is at rest.

An object of the invention is to provide a method of extracting articles such as cigarette filter stubs from a system with the minimum damage to the articles. A further object of the invention is to provide a system in which the articles can be extracted from the system at a rate which is independent of the rate at which they are introduced into the sytsem.

A method according to the invention also includes the steps of reducing the carrying power of the motive gas towards the end of the path, receiving articles decelerated by the reduction of the carrying power in a length consisting in a plurality of articles brought to rest at the end of the path, axially propelling each article in turn at the end of the path by means of a gas to eject the article from the path, catching and holding an article thus ejected, causing the article thus caught to block further ejection of articles, and transferring the caught article laterally to clear the way for the ejection of another article and so on.

Apparatus according to the invention consists in means to reduce the carrying power of the gas flowing in the pipeline, a length of pipe continuous with the pipeline beyond the reducing means, at the end of the length of pipe means for pneumatically ejecting the last article in the length of pipe, means to catch an article thus ejected in a position to block ejection of further articles, and means for laterally transferring an article caught by the catch means.

A pneumatic conveyance system according to the invention also includes at one end of the pipeline means to dispatch goods continuously into and along the pipeline at a predetermined rate, at the other end of the pipeline means for bringing the goods to rest in a length of pipe, means for dispensing goods from the length of pipe at a predetermined rate, a store for receiving goods thus dispensed and from which the goods are consumed at a predetermined rate, and means for starting and stopping the dispatch means in response to the level of goods in the store, dispatch being stopped when the goods reach a predetermined high level and being started when the goods reach a predetermined low level, the dispatching means being arranged to dispatch goods into the pipeline at a rate faster than the rate of consumption and the dispensing means being arranged to operate at such a speed that the rate of dispensing is faster than the rate of dispatch.

The invention further provides that the system may include means to sense the presence of goods in the length of pipe at a predetermined point spaced from the dispensing means, the dispensing means being responsive to the sensing means to dispense goods when the sensing means detects goods at the point and to cease dispensing goods when the sensing means detects the absence of goods at the point.

The invention is further described with reference to the accompanying drawings, in which FIGURE 1 is a diagrammatic lay-out of a system according to the invention, FIGURE 2 is a view, partly in section, of the end of the line in a system such as that of FIGURE 1, FIGURE 3 is a section along the line 3—3 in FIGURE 2, and FIGURE 4 is an enlarged view of a part of FIGURE 3.

The system illustrated in FIGURE 1 is shown diagrammatically as the various components of the system may take a wide variety of forms.

The system which is shown has been designed for the case where the hopper of a cigarette making machine has to be kept supplied with filter stubs from a filter making room or store-room which is, say, 150 metres from the machine.

In the system articles from, say, a hopper 5 are extracted one by one and inserted into the intake of a pneumatic pipeline 6 by means of a dispatching device 7. The device 7 may be a fluted side valve or a fluted drum or a vane air lock. A suitable start and stop mechanism 8 controls the dispatch.

The pipeline 6 may extend over any suitable length and booster stations may be provided along its length in a manner well-known in the art.

Towards the end of the pipeline 6 there is a decelerating means 9 which may, for example, take the form described later on in this specification. The means 9 is about 3 metres away from a hopper 10 which is being fed by the system in the case of cigarette filter stubs. However, pipe 11 could be of any suitable length depending on the circumstances. The pipe 11 leads into a box 12 in which means is provided to ensure that the last article in the pipe 11 is axially propelled into a take-off mechanism actuated by a motor 13 through a magnetic clutch 14. The take-off mechanism displaces a stub sideways into the hopper 10 and may take the form to be described later on. Other mechanisms for effecting this lateral transfer are known.

At a suitable point along the pipe 11 there is a light source and an electric eye device 15. At least at that point the pipe 11 is of a transparent material and the device 15 is arranged to detect the presence of stubs at that point. The output from the device 15 controls the clutch 14. If there is no output the clutch is off and if there is an output the clutch is on. For reasons to be described later on the device 15 is arranged to have a delay of about 100 milliseconds.

Light source and electric eye devices 16 and 17 are positioned at different levels in the bin 10. The device 16 detects when the bin is full and the device 17 detects when the level in the bin has reached a predetermined low point above the point where the take-off mechanism operates. The outputs of the devices 16 and 17 control the start and stop mechanism 8. A signal from the device 17 effects starting and a signal from the device 16 causes stopping.

In use, the rate at which the device 7 can dispatch stubs along the line 6 is arranged to be higher than the rate of consumption from the store 10. Thus if the store 10 serves a cigarette making machine, the device 7 dispatches stubs at a faster rate than that at which the cigarette making machine uses stubs. The speed of the motor 13 is so chosen that the take-off mechanism propels stubs laterally into the hopper 10 at a rate faster than the rate of dispatch.

However, the take-off mechanism can only operate when the clutch 14 is on. This happens when the pipe bridged by the device 15 is filled up to the point where the device 15 is situated. The reason for the 100 milliseconds' delay is now apparent: the clutch 14 should not be actuated by articles going past, but by articles at rest.

At the start with the hopper 10 at low level, the device 17 sends a starting signal to the mechanism 8. The dispatch device 7 then starts operating and stubs travel along the line 6. Stubs are decelerated at 9 and come to rest in the pipe 11. Until the pipe 11 is filled to the point where the device 15 is situated, the clutch 14 remains off and no articles are fed into the hopper 10. As soon as the clutch 14 is actuated, articles are fed into the hopper 10.

Since the rate of consumption is less than the rate of dispatch, the hopper will gradually fill up. However, this filling up is not continuous. The take-off mechanism extracts stubs from the pipe 11 at a faster rate than they come to rest in the pipe 11 so that from time to time the clutch 14 is de-energized. But the dispatch along the system is continuous until the level of the device 16 is reached. At this point the mechanism 8 is actuated to discontinue dispatch and when too few articles are present in the pipe 11 the take-off mechanism also ceases to operate.

Meanwhile articles are being consumed from the hopper 10. When the level in the hopper extends to below the device 17, a signal goes to the mechanism 8 and dispatch is resumed, shortly afterwards the take-off mechanism starts to operate and this goes on until once more the device 16 gives its signal.

In a system of the length previously stated, i.e. of the order of 150 metres, it is possible to have only one electric eye device controlling the bin 10. In this case the device is put at a mean level in the bin. The natural delay in the system ensures that the predetermined low level is reached before goods are being fed into the bin. This natural delay also ensures that the predetermined high level is reached when all the goods in transit reach the bin.

Thus the single device gives a starting signal when the light path is complete, i.e. when the level in the bin drops below it, and gives the stop signal when the level in the bin rises up to its level and the light path is interrupted.

In short systems or in long systems where the natural delay is not of the right order for the capacity of the bin 10, the use of two devices as illustrated may be essential.

FIGURE 2 illustrates the arrangements at the end of the pipeline 6 in greater detail. As shown the pipeline 6 terminates in a box 9 in which the continuation of the pipeline has slots 20 which allow for the escape of the motive air into the box 9. Stubs coming along the line 6 continue under their own momentum into the pipe 11.

Air from the box 9 is by-passed to another box 12 similar to the box 9 along a pipe 23. In this case air enters through the slots 20 and tends to push articles in the pipe 112 to the right. Small vent holes may be provided in the pipe 112 to allow for the escape of air when the articles cannot move. In any case air escapes around the articles.

A given article or stub comes to rest in the axial sense against an end wall 22.

The same effect as the pipe 23 may be achieved by making the pipe 11 of a larger diameter than the pipes 6 and 112. The essence is that the air must have an easier path to follow than that which it will have to follow when propelling stubs.

A stub lying against the wall 22 is propelled laterally by means of the take-off mechanism illustrated and also shown in FIGURES 3 and 4.

The take-off mechanism consists in a rotor having radial arms 25. The rotor is rotated by a pulley driven off a shaft which is connected with the clutch referred to above.

At their ends the arms may have cylindrical paddles 26 whose orbits intersect the axis of a stub laying against the stop 22—see FIGURES 3 and 4. A stub to be propelled is received on a surface 27 which is one side of a slot 27 leading into the hopper 10. The upper side of the slot 27 is gapped to allow for passage of the paddles 26.

As can be seen from FIGURE 3 the slot 27 is continuous with smoothly curved sides of the hopper 10. The curved part 28 is designed with a view to causing stubs to roll into the hopper while retaining their axial orientation. In practice, it is found that the axial orientation is not easily retained. However, if the mouth of the slot 27 is below the level of stubs in the hopper 10 or the stubs are above the mouth of the slot, say, above the chain line 29, stubs dispensed into the hopper 10 retain their correct orientation. For this reason it is preferred that the level of stubs in the bin 10 should never get lower than a predetermined level. Usually this can be achieved by observation. If necessary, the signal from the device 17 could be fed to a suitable delay circuit and if the signal is not cancelled within a predetermined time by a signal from the device 15, the circuit could actuate an alarm or stop the making machine.

I claim:

1. A pneumatic conveyance system for conveying goods by pneumatic force along an elongated pipeline, which system includes at one end of the pipeline means to dispatch goods continuously into and along the pipeline at a predetermined rate, at the other end of the pipeline means for bringing the goods to rest in a length of pipe, means for dispensing goods from the length of pipe at a predetermined rate, a store for receiving goods thus dispensed and from which the goods are consumed at a predetermined rate, and means for starting and stopping the dispatch means in response to the level of goods in the store, dispatch being stopped when the goods reach a predetermined high level and being started when the goods reach a predetermined low level, the dispatching means being arranged to dispatch goods into the pipeline at a rate faster than the rate of consumption and the dispensing means being arranged to operate at such a speed that the rate of dispensing is faster than the rate of dispatch.

2. The system claimed in claim 1 including means to sense the presence of goods in the length of pipe at a predetermined point spaced from the dispensing means, the dispensing means being responsive to the sensing means to dispense goods when the sensing means detects goods at the point and to cease dispensing goods when the sensing means detects the absence of goods at the point.

3. A method for conveying goods pneumatically, comprising dispatching goods pneumatically at one end of an elongated pipeline continuously into and along the pipeline at a predetermined rate, bringing the goods to rest in a length of pipe at the other end of the pipeline, dispensing goods from said length of pipe at a predetermined rate, storing the received goods thus dispensed in a storage area, consuming the stored goods at a predetermined rate, and starting and stopping said ditspatch of goods to maintain about a predetermined quantity of stored goods in said storage area, said predetermined rate of dispatch being higher than said rate of consumption, and said dispensing rate being higher than said rate of dispatch.

4. A method as claimed in claim 3, and performing said dispensing operation only when a predetermined minimum length of goods is at rest.

References Cited

UNITED STATES PATENTS

| 2,373,183 | 4/1945 | Hawthorne | 198—185 |
| 2,781,232 | 2/1957 | Smith | 302—2 |
| 3,089,732 | 5/1963 | Gamberini | 302—2 |

FOREIGN PATENTS

| 218,957 | 1/1962 | Austria. |
| 1,099,520 | 3/1955 | France. |

EVON C. BLUNK, *Primary Examiner.*

ANDRES H. NEILSEN, *Examiner.*